(12) United States Patent
Yang et al.

(10) Patent No.: US 12,429,817 B1
(45) Date of Patent: Sep. 30, 2025

(54) SYSTEMS AND METHODS FOR WRITING SPATIALLY VARYING HOLOGRAMS

(71) Applicant: Meta Platforms Technologies, LLC, Menlo Park, CA (US)

(72) Inventors: Yang Yang, Redmond, WA (US); Wen Xiong, Redmond, WA (US); Jian Xu, Redmond, WA (US); Jianbo Zhao, Kirkland, WA (US); Peter Johnsen, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 533 days.

(21) Appl. No.: 17/974,308

(22) Filed: Oct. 26, 2022

Related U.S. Application Data

(60) Provisional application No. 63/294,324, filed on Dec. 28, 2021.

(51) Int. Cl.
*G03H 1/02* (2006.01)
*G02B 5/32* (2006.01)
*G11B 7/0065* (2006.01)

(52) U.S. Cl.
CPC ............. *G03H 1/0248* (2013.01); *G02B 5/32* (2013.01); *G11B 7/0065* (2013.01); *G03H 2001/0216* (2013.01); *G03H 2001/022* (2013.01)

(58) Field of Classification Search
CPC .................................................... G03H 1/0248
See application file for complete search history.

(56) References Cited

U.S. PATENT DOCUMENTS

| | | | | |
|---|---|---|---|---|
| 5,665,493 A | * | 9/1997 | Bai | ........................ G11B 7/243 |
| 2017/0098461 A1 | * | 4/2017 | Neo | ..................... G11B 7/0053 |

\* cited by examiner

*Primary Examiner* — Edmond C Lau
(74) *Attorney, Agent, or Firm* — Greenberg Traurig, LLP

(57) ABSTRACT

An apparatus, system, and method for a hologram recording system include a recording medium, a light source, and optical elements. The recording medium is configured to record a hologram. At least one light source is configured to provide a writing beam. The optical elements are positioned in a light path of the writing beam and are configured to condition the writing beam to record the hologram at least partially in the volume. The optical elements may include at least one toric optical element and a mirror. The toric optical element may be configured to subtract a quadratic phase from a wavefront of the writing beam, and the mirror may be configured to subtract a linear phase from the wavefront of the writing beam.

20 Claims, 15 Drawing Sheets

1100

1110

$$\theta_2 = \cos^{-1}(\hat{n}_{sample} \cdot \hat{k}_{in})$$

SYSTEMS AND METHODS FOR WRITING SPATIALLY VARYING HOLOGRAMS

CROSS-REFERENCE TO RELATED APPLICATIONS

This application claims priority to U.S. Provisional Application No. 63/294,324 filed Dec. 28, 2021, which is hereby incorporated by reference.

TECHNICAL FIELD

This disclosure generally relates to holography, and in particular to recording holograms.

BACKGROUND INFORMATION

Holography is the science related to recording light-operative structures on or in an optical medium. Holography has many applications and may be used to improve eye tracking technology. Eye tracking technology enables head mounted displays (HMDs) to interact with users based on the users' eye movement or eye orientation. Existing eye tracking systems can be technically limited by natural obstructions. For example, eyelashes and eyelids can obstruct images taken of an eye, which may decrease the quality of eye tracking operations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
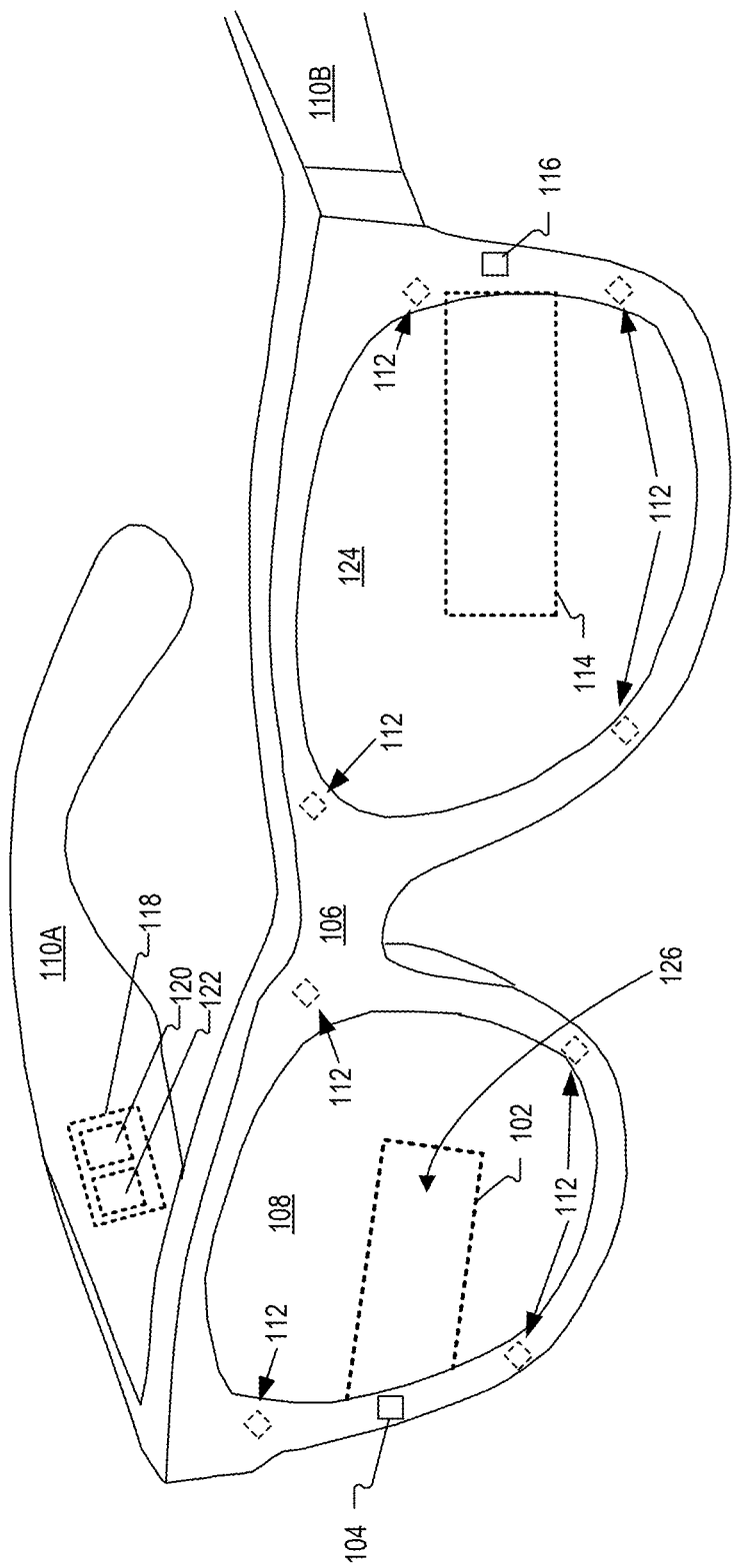
FIG. 1 illustrates a head mounted display, in accordance with aspects of the disclosure.

Embodiments of a system and methods for conically recording spatially varying holograms are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

As used herein, a diffraction grating may include a ruled grating or a holographic grating. A holographic grating may include a substrate with a photosensitive material onto which grating planes are recorded (e.g., internal to the substrate). Although the techniques disclosed herein are not limited to recording grating planes, grating planes (e.g., slanted grating planes) may be considered one type of hologram (e.g., spatially varying hologram). A holographic grating may also be referred to as a holographic optical element (HOE).

As used herein, single-shot recording refers to recording a hologram in a recording medium while the recording medium remains in a fixed position. By contrast, non-single-shot recording would refer to a multi-step recording process that includes recording one grating in the medium, re-orienting the recording medium/recording beams, recording another grating on the medium, and continuing the process of re-orienting and recording.

As used herein, conical recording includes exposing a recording medium to writing beams that have exposure angles that are not in a single plane (co-planar). Rather, in conical recording, the writing beams have exposure angles that are in different planes or that occupy multiple planes.

A hologram recording system may be configured to enable single-shot conical recording of spatially varying holograms, in accordance with embodiments of the disclosure. The hologram recording system may include one or more light sources to generate writing beams, a recording medium, and a number of optical elements positioned between the one or more light sources and the recording medium.

The optical elements may be configured to prepare or condition wavefronts of the writing beams for conically recording a hologram. To prepare or condition the wavefronts, the optical elements may be configured to subtract one or more types of phase from the wavefronts of the writing beams. The optical elements may include one or more mirrors that are configured to subtract a linear phase from a wavefront by tilting the wavefront or writing beam, according to an embodiment. The optical elements may include a toric optical element configured to subtract a quadratic phase from a wavefront when the writing beam passes through the toric optical element. The toric optical element may be a concave or convex optical element. Based on the phase operations on the wavefronts by the optical elements, a phase of a particular wavefront for a hologram may be backpropagating to a spatial light modulator (SLM) or back to a light source.

A number of operations may be used to define characteristics (e.g., angles, magnitude) of writing beam vectors, in accordance with aspects of the disclosure. First writing beam vectors may be defined based on the wavelength of light of the beam, the number of grates in the hologram, the distance between grates in the hologram. An angle between the first writing beam vectors and second writing beam vectors may be based on similar properties. The grating vectors are vectors that are normal to the grating planes of the hologram, and grating vectors may be partially defined based on a distance between grates on the planes, according to an embodiment. The first writing vector may be rotated along at least two planes to align the first writing vectors with the grating vectors. The second writing beam vectors may be determined based on the first writing vectors and the grating vectors. The first and second writing vectors may be used to generate wavefronts that produce spatially varying grating planes for the hologram, in accordance with aspects of the disclosure.

The apparatus, system, and method for conically recording spatially varying holograms that are described in this disclosure may enable improvements in eye tracking technologies, for example, to support operations of an HMD. These and other embodiments are described in more detail in connection with FIGS. 1-14.

FIG. 1 illustrates an example head mounted display (HMD) 100 that supports eye tracking from within the field of vision (in-field) of a user, in accordance with embodiments of the disclosure. HMD 100 includes a waveguide system 102 that is configured to in-couple light from an eyebox region and out-couple the light from the eyebox region to an image sensor 104 that is positioned in or on a frame 106, according to an embodiment. Waveguide system 102 may include one or more holograms configured to in-couple or out-couple light from the eyebox region. The one or more holograms may be recorded using one or more systems and methods disclosed herein. Waveguide system 102 is partially disposed within a lens assembly 108 and is partially positioned within frame 106, to support in-field reception of light reflected from an eyebox region, according to an embodiment. An advantage of in-field imaging of the eyebox region and a user's eye is that positioning waveguide system 102 in front of a user's eye reduces obstructions such as eyelids and eyelashes that may reduce the quality of images that can be captured from a user's eye. Another advantage of in-field imaging of the eyebox region may be improved reception of reflections from the user's eye, according to aspects of the disclosure. Waveguide system 102 may be used to support eye tracking, user experience (UX), and other features of HMD 100. An HMD, such as HMD 100, is one type of head mounted display, typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

HMD 100 carries waveguide system 102 and image sensor 104 with frame 106. Frame 106 is coupled to arms 110A and 110B. Lens assembly 108 is mounted to, inserted into, or otherwise carried by frame 106. Lens assembly 108 may include a prescription optical layer matched to a particular user of HMD 100 or may be a non-prescription lens. The illustrated HMD 100 is configured to be worn on or about a head of a wearer of HMD 100.

Lens assembly 108 may appear transparent to a user to facilitate augmented reality or mixed reality and to enable a user to view scene light from the environment around her while also receiving image light directed to her eye(s). Consequently, lens assembly 108 may be considered (or include) an optical combiner. Lens assembly 108 may include two or more optical layers that carry portions of waveguide system 102, in an embodiment. In some embodiments, display light from one or more integrated displays is directed into one or both eyes of the wearer of HMD 100.

Waveguide system 102 and image sensor 104 can be configured to capture images of reflections off of a user's eye, according to an embodiment. To generate reflections of light off of the user's eye, HMD 100 may include a number of light sources 112 positioned at one or more locations around frame 106. Light sources 112 are oriented to direct light towards the eyebox region, to illuminate at least one user's eyes. Light sources 112 may emit light that is in the non-visible spectrum. For example, light sources 112 are configured to emit infrared light, for example, having a wavelength in the range of 750 nm to 1500 nm, according to an embodiment. Light sources 112 may be light emitting diodes (LEDs), vertical-cavity surface-emitting lasers (VCSELs), micro light emitting diode (micro-LED), an edge emitting LED, a superluminescent diode (SLED), or another type of light source. In one embodiment, light emitted from some of light sources 112 is infrared light centered around 850 nm. Infrared light from other sources may illuminate the eye as well. HMD 100 may be configured to use images of reflections off of a user's eyes to determine an orientation of a user's eye and/or to perform eye tracking operations, according to an embodiment.

HMD 100 includes a controller 118 communicatively coupled to image sensor 104, according to an embodiment. Controller 118 is coupled to image sensor 104 to receive images captured by image sensor 104 using waveguide system 102, according to an embodiment. Controller 118 may include processing logic 120 and one or more memories 122 to analyze image data received from image sensor 104, to determine an orientation of one or more of a user's eyes, to perform one or more eye tracking operations, and/or to display or provide user interface elements in lens assembly 108, according to an embodiment. Controller 118 may include a wired and/or wireless data interface for sending and receiving data and graphic processors and may include one or more memories 122 for storing data and computerexecutable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

HMD 100 may include a waveguide system 114 and an image sensor 116 positioned on or around a lens assembly 124 that is on, for example, a left side of frame 106. Waveguide system 114 may include similar features as waveguide system 102, according to an embodiment. Image sensor 116 may be configured to operate similarly to image sensor 104 and may also be coupled to controller 118, according to an embodiment. Lens assembly 124 may include similar features and/or layers as lens assembly 108.

Waveguide system 102 may be configured to pass or transmit scene light from a scene side of HMD 100 so that waveguide system 102 appears to be transparent to a user of HMD 100. Waveguide system 102 is also configured to selectively direct light from, for example, a center region 126 of lens assembly 108 to image sensor 104, according to various aspects of the disclosure.

Figure 2:
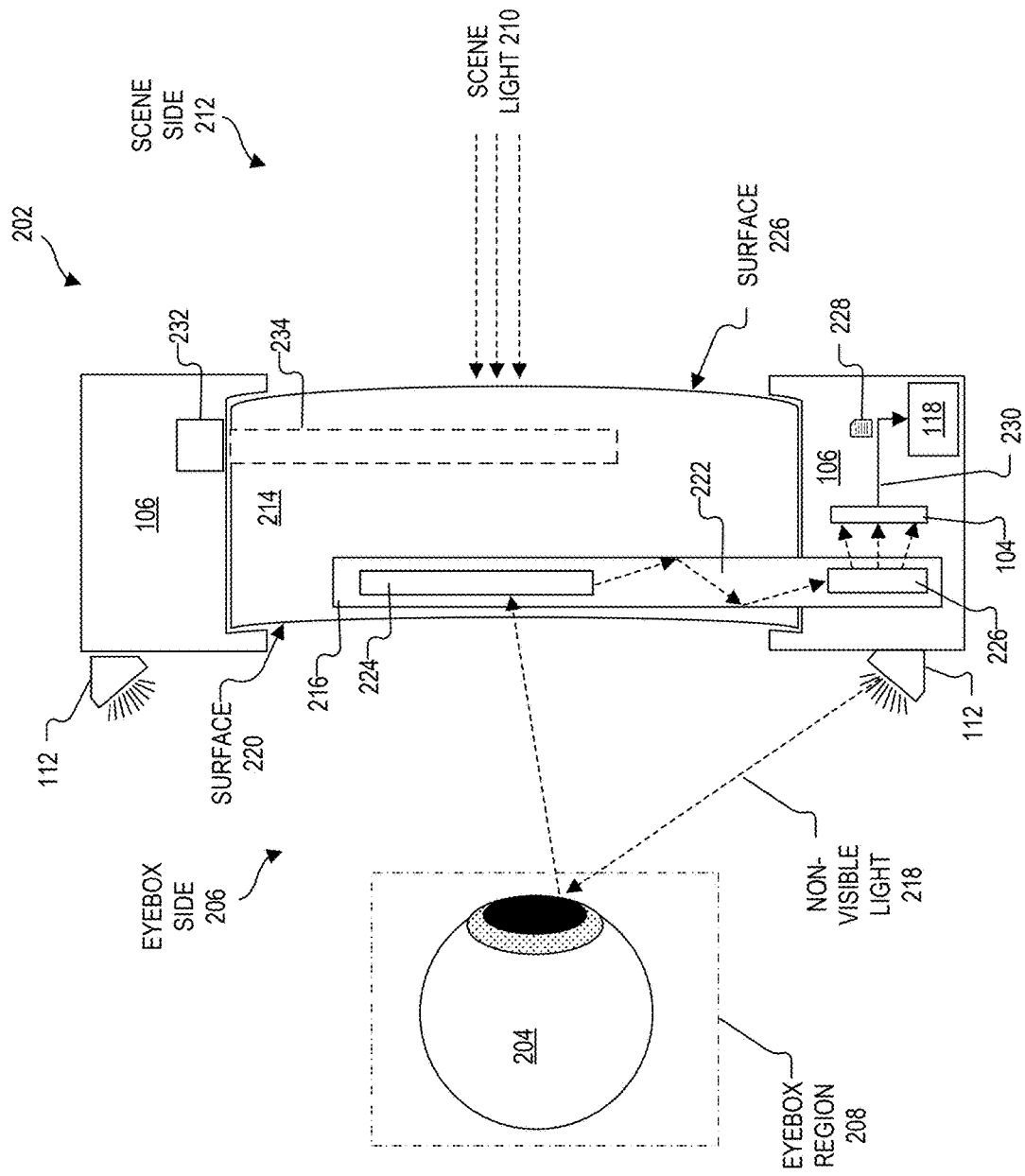
FIG. 2 illustrates an example implementation of a lens assembly for a head mounted display, in accordance with aspects of the disclosure.

FIG. 2 illustrates an example top view of an ocular environment 200, in accordance with various embodiments of the disclosure. Ocular environment 200 includes an HMD 202 and an eye 204, according to an embodiment. HMD 202 is an example implementation of HMD 100. As illustrated, HMD 202 is a partial cross-sectional view of aspects of a head mounted display, according to an embodiment. Eye 204 is positioned on an eyebox side 206 of HMD 202. Eye 204 is positioned in an eyebox region 208 on eyebox side 206 and is positioned to receive scene light 210 from a scene side 212. Scene light 210 passes through a lens assembly 214 to eyebox region 208 and to eye 204, according to an embodiment. Scene light 210 passes from scene side 212 through lens assembly 214 and through waveguide system 216 to eyebox side 206.

Waveguide system 216 is an example implementation of waveguide system 102 and/or 114, according to an embodiment. Waveguide system 216 is configured to receive reflections of non-visible light 218 that becomes incident on surface 220 from eye 204 and/or eyebox region 208, according to an embodiment. Waveguide system 216 includes a waveguide 222, an in-coupling diffraction grating 224, and an out-coupling diffraction grating 226, according to an embodiment.

Waveguide system 216 is configured to receive reflections of non-visible light 218 with in-coupling diffraction grating 224, according to an embodiment. In-coupling diffraction grating 224 may include a recorded hologram that is configured to in-couple reflected light into waveguide 222, according to an embodiment. By in-coupling the reflected light into waveguide 222, in-coupling diffraction grating 224 directs the reflected light to out-coupling diffraction grating 226, according to an embodiment. Out-coupling diffraction grating 226 receives the reflected light from in-coupling diffraction grating 224, after the reflected light has propagated from in-coupling diffraction grating 224 to out-coupling diffraction grating 226 through total internal reflection (TIR) within waveguide 222, according to an embodiment.

Out-coupling diffraction grating 226 is configured to receive the reflected light and out-couple the reflected light from waveguide 222, according to an embodiment. Out-coupling diffraction grating 226 may include a hologram (e.g., including grating planes or slanted grating planes) that is configured to provide the received reflected light to image sensor 104, according to an embodiment. As illustrated, out-coupling diffraction grating 226 and image sensor 104 may be positioned within (or on) a portion of frame 106 (e.g., out of the field-of-view of eye 204), according to an embodiment. Out-coupling diffraction grating 226 and a portion of waveguide 222 may be positioned within a portion of frame 106, to facilitate out-coupling of the reflected light from out-coupling diffraction grating 226 to image sensor 104, according to an embodiment. Out-coupling diffraction grating 226 may be implemented as two or more out-coupling diffraction gratings that are configured to direct light to two or more respective image sensors, according to an embodiment.

Image sensor 104 is configured to convert the received reflected light into electrical signals. The electrical signals may be representative of the reflected light received by in-coupling diffraction grating 224, according to an embodiment. Image sensor 104 converts the received reflected light into image data 228 and provides image data 228 to controller 118 through a communications channel 230, according to an embodiment. In other words, controller 118 may be communicatively coupled to receive image data 228 from image sensor 104. Controller 118 may employ one or more of a variety of techniques to determine an orientation of eye 204 and perform one or more eye tracking operations based on image data 228, according to an embodiment.

HMD 202 may include a projector 232 and a display 234 that are configured to provide information and/or user interface elements to eyebox region 208 for viewing by a user of HMD 202, according to an embodiment. Display 234 may include a liquid crystal display (LCD), an organic light emitting diode (OLED) display, micro-LED display, quantum dot display, pico-projector, or liquid crystal on silicon (LCOS) display for directing image light to a wearer of HMD 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 and may be configured to project information at least partially based on an orientation of eye 204, according to an embodiment.

Lens assembly 214 is illustrated as a single optical layer for illustrative purposes. Lens assembly 214 may be implemented as a single optical layer, as illustrated, or may be implemented as two or more optical layers coupled together to include waveguide system 216 and display 234, according to an embodiment.

Figure 3:
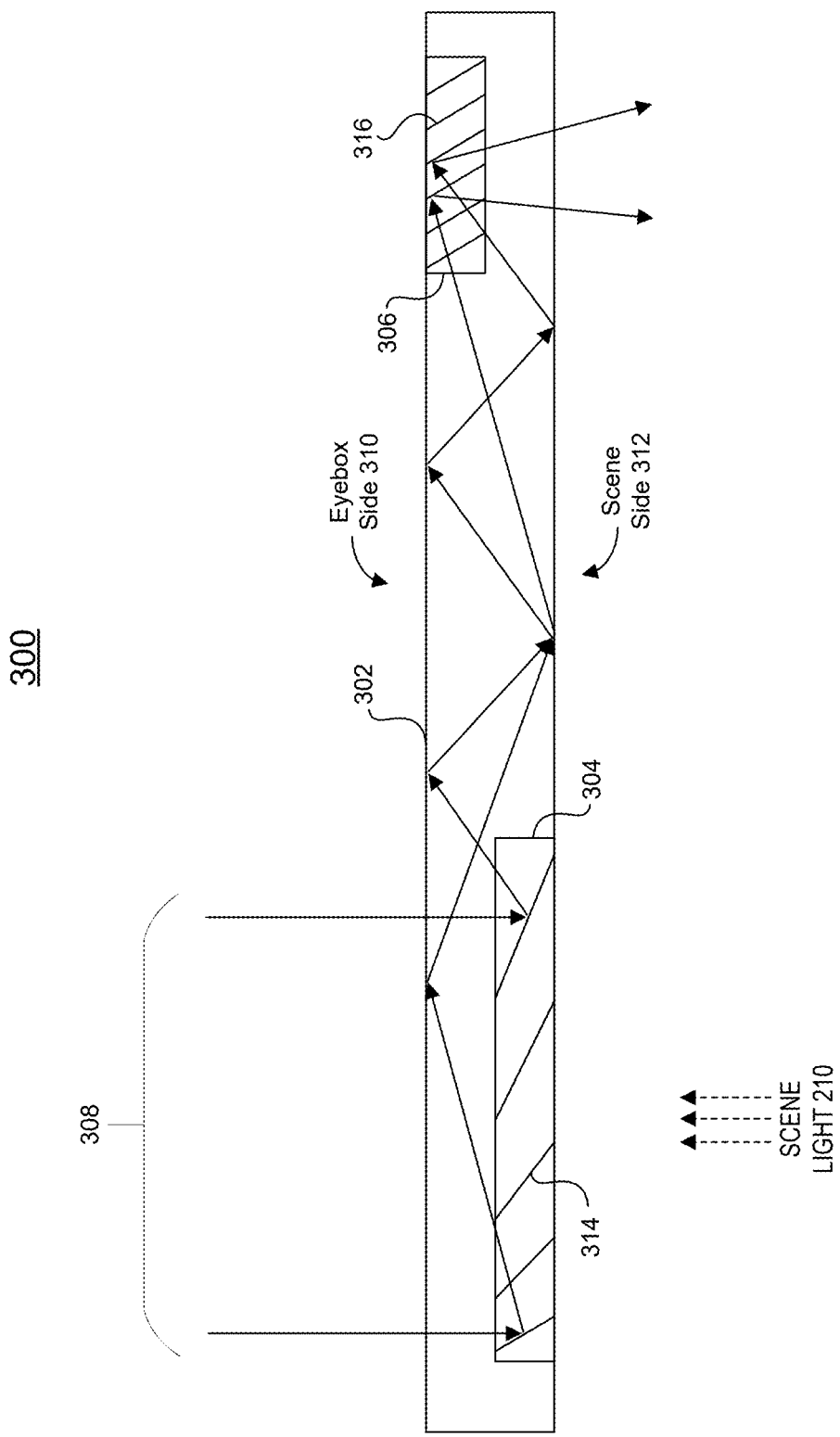
FIG. 3 illustrates an example implementation of a spatially varying hologram in a waveguide system that may be implemented into one or more of the disclosed HMDs, in accordance with aspects of the disclosure.

FIG. 3 illustrates an example of a spatially varying hologram in a waveguide system 300 that may be implemented into one or more of the disclosed HMDs, in accordance with aspects of the disclosure. Waveguide system 300 may include a waveguide 302, an input holographic optical element (HOE) 304, and an output HOE 306.

Waveguide system 300 is configured to operate on light rays 308 that are incident on an eyebox side 310 and may be configured to pass scene light 210 that is incident on a scene side 312 of waveguide 302, according to an embodiment. Waveguide system 300 is configured to receive light rays 308, propagate light rays 308 from input HOE 304 to output HOE 306, and emit or provide light rays 308 as output, according to an embodiment. Waveguide 302 may enable scene light 210 to pass from scene side 312 to eyebox side 310 of waveguide system 300 and may carry input and output HOE 304 and 306.

Input HOE 304 and output HOE 306 are examples of optical elements having spatially varying holograms that may be recorded with systems and methods of the disclosure. Input HOE 304 includes a number of grating planes 314. Grating planes 314 include diffraction gratings that operate in transmission or reflection to diffract incident light based on a grating period and a slant angle of each grating plane, according to an embodiment. Grating planes 314 may be slanted from one side to another of input HOE 304. Grating planes 314 may have a different slant angle on one end of input HOE 304 than on the other end of input HOE 304. The slant angles of grating planes 314 may gradually change from one end to the other of input HOE 304 to operate on light rays 308 differently based on the incident position of the light rays. Grating planes 314 are an example of a spatially varying hologram that is recorded in a body of input HOE 304, according to an embodiment. Vectors that are normal to the surfaces of grating planes 314 are examples of grating vectors, according to an embodiment. The size of waveguide 302, the size of input HOE 304, the size of output HOE 306, the wavelength of operation, the size of the eyebox may all be factors or characteristics used in defining the grating planes and therefore the grating vectors, in accordance with aspects of the disclosure.

Output HOE 306 includes a number of grating planes 316, according to an embodiment. Grating planes 316 may be slanted from one surface to another of output HOE 306. Grating planes 316 are an example of a hologram that is recorded in a body of output HOE 306, according to an embodiment. Vectors that are normal to the surfaces of grating planes 316 are examples of grating vectors, according to an embodiment.

Figure 4:
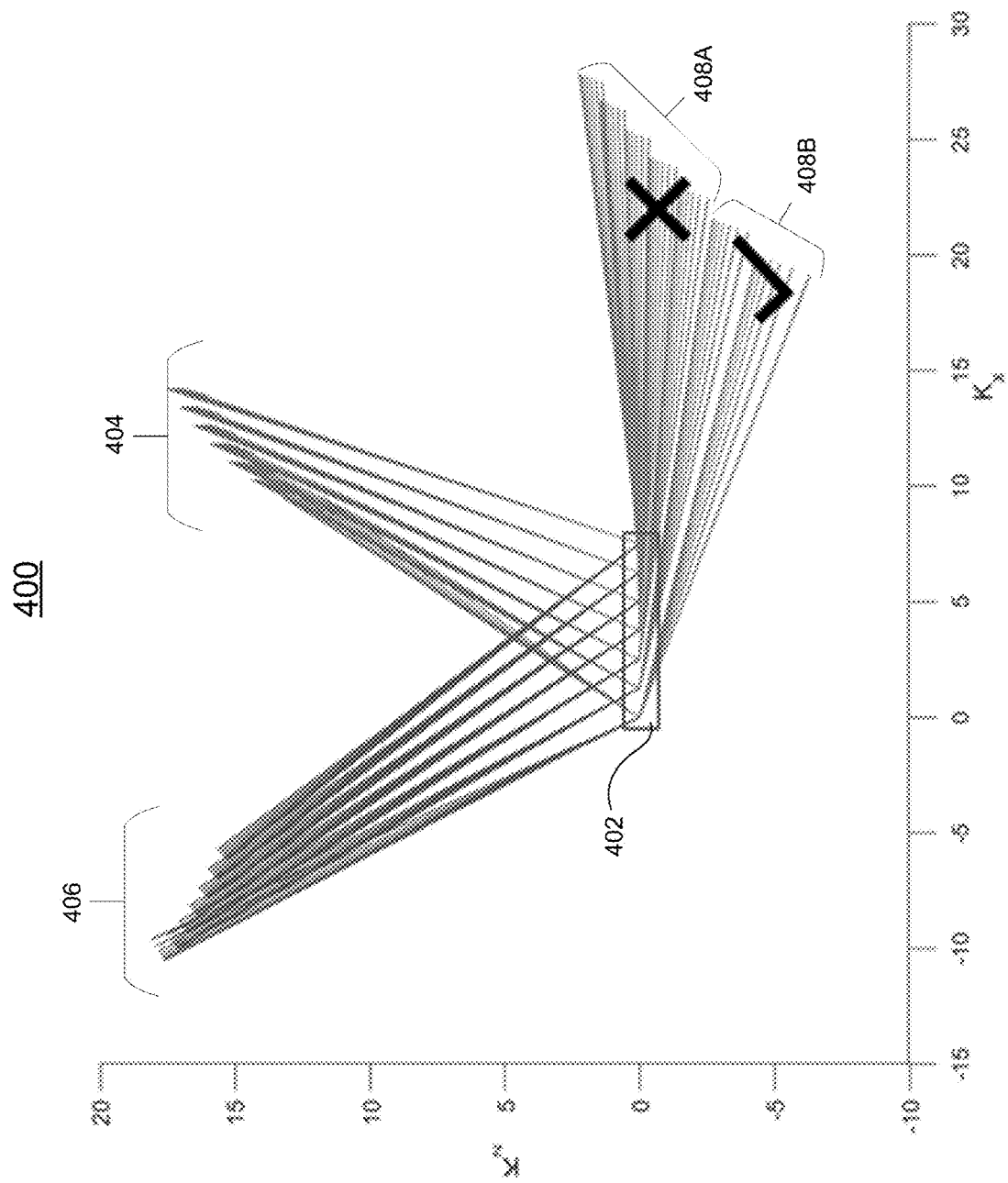
FIG. 4 illustrates a graph 400 that demonstrates a challenge in recording spatially varying holograms in a volume of a recording medium.

FIG. 4 illustrates a graph 400 that demonstrates a challenge in recording spatially varying holograms in a volume of a recording medium. Recording a hologram using in-plane exposure can result in writing angles that are not possible with current technology. In-plane exposure refers to writing to the surfaces of a recording medium from a single plane represented by 2 axes (e.g., $K_xK_z$, $K_xK_y$, $K_yK_z$). In-plane exposure can also refer to both writing beams being in the same plane. Graph 400 includes a vector space x-axis that is labeled as $K_x$ and includes a vector space z-axis that is labeled as $K_z$. Graph 400 includes a recording medium 402 (e.g., an optical element), grating vectors ($K_g$) 404, first writing beam vectors ($K_1$) 406, and second writing beam vectors 408 ($K_2$). Individually, second writing beam vectors 408 are second writing beam vectors 408A and second writing beam vectors 408B. Writing vectors may have an incident angle (with respect to the surface normal) of approximately −60° to 60°. Writing vectors may have an incident angle (with respect to the surface normal) that extends beyond, −60° to 60°, but performance may decrease beyond this range. Writing vectors with incident angles that are less than −80° or that are greater than 80° may be needed to record a particular hologram (e.g., a spatially varying volume hologram), but at these angels recording does not typically work. For example, second writing vectors 408A are illustrated as exceeding 80° and are an example of writing angles that would not result in the intended or designed hologram. Second writing vectors 408B are illustrated as being within an acceptable writing angle, however, these writing angles may be insufficient to successfully record a particular spatially varying hologram (e.g., input HOE 304, shown in FIG. 3).

Figure 5:
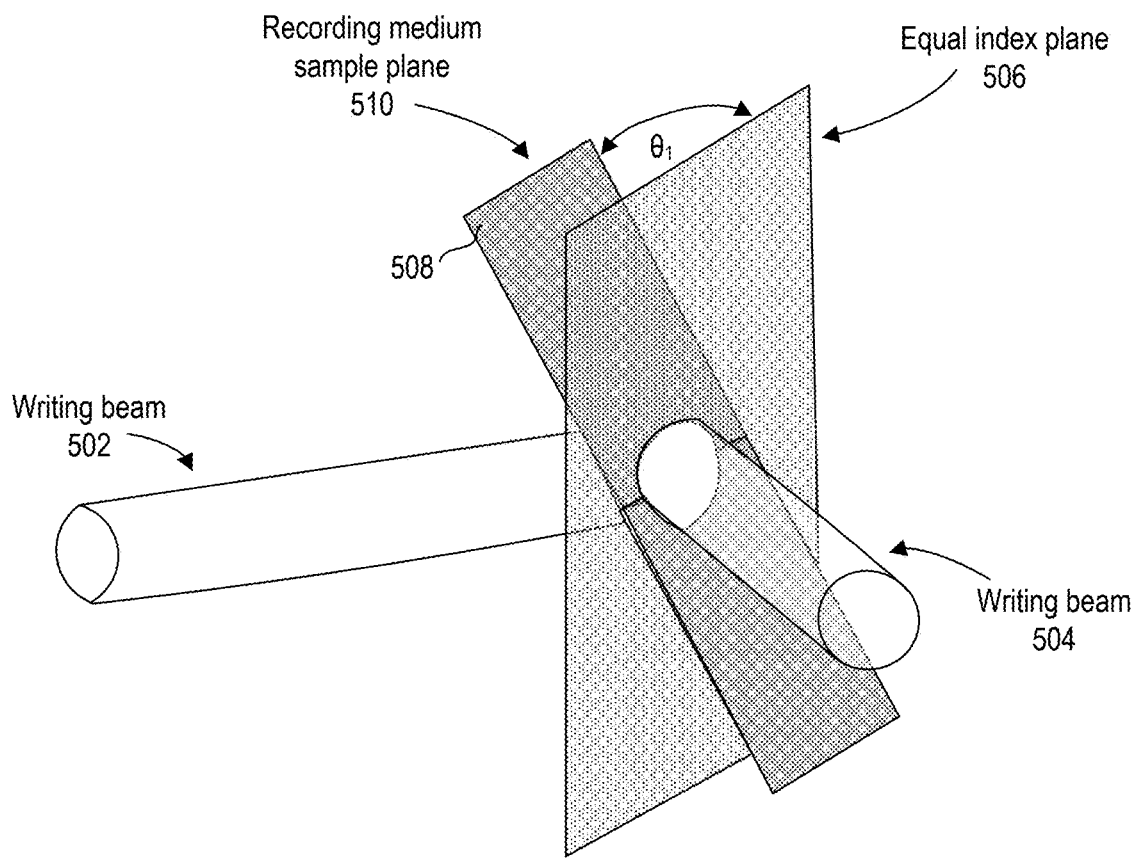
FIG. 5 illustrates a conical writing beam configuration that may enable recording of spatially varying holograms, in accordance with aspects of the disclosure.

FIG. 5 illustrates a conical writing beam configuration 500 that may enable recording (e.g., single-shot recording) of spatially varying holograms, in accordance with aspects of the disclosure. Conical writing beam configuration 500 includes a first writing beam 502, a second writing beam 504, an equal index plane 506, and a recording medium 508 positioned in a recording medium sample plane 510, for recording a hologram onto recording medium 508, according to an embodiment. First writing beam 502 and second writing beam 504 would intersect equally at equal index plane 506. However, recording medium 508 is aligned with recording medium sample plane 510, which is offset from equal index plane 506. Recording medium sample plane 510 may be offset from equal index plane 506 by an angular offset $\theta_1$, as an example. Angular offset $\theta_1$ may be an angular rotation that aligns an average of grating vectors with a particular value on a particular axis (e.g., $K_z$=0), as described in relation to FIG. 7A, according to an embodiment.

Figure 6:
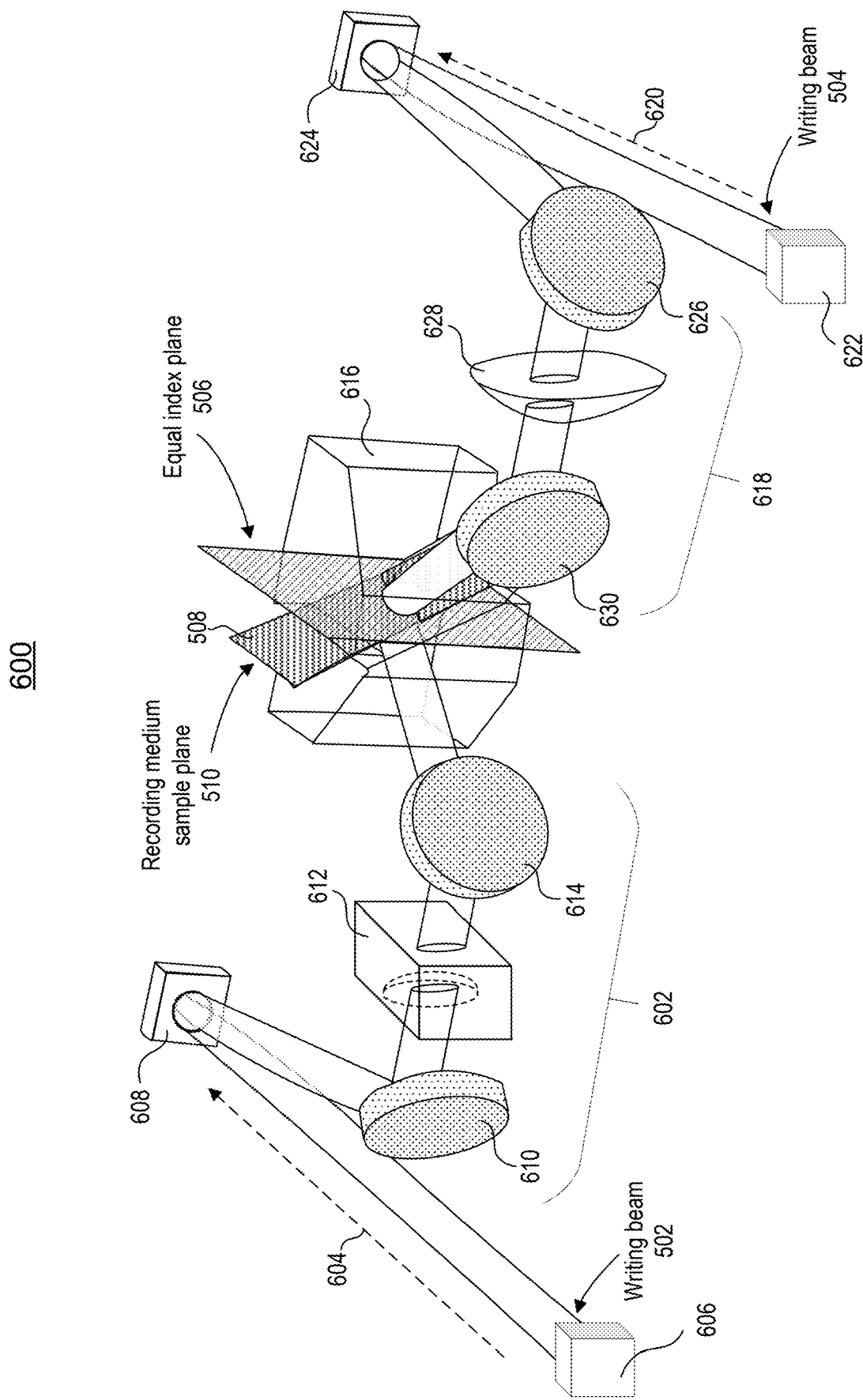
FIG. 6 illustrates a system configured to perform recording of spatially varying holograms, in accordance with aspects of the disclosure.

FIG. 6 illustrates a system 600 configured to record (e.g., single-shot record) spatially varying holograms, in accordance with aspects of the disclosure. System 600 includes conical writing beam configuration 500 and includes a number of optical elements positioned in the light paths of the writing beams to condition or prepare the beams for recording a hologram on recording medium 508, according to an embodiment. The optical elements may be configured to subtract or otherwise modify one or more types of phase from wavefronts of the writing beams and may enable backpropagating and defining wavefronts at the light sources of system 600.

System 600 includes a number of first optical elements 602 positioned in a light path 604 of first writing beam 502, to condition or prepare first writing beam 502 to support conically writing a spatially varying hologram, according to an embodiment. System 600 may include a light source 606 that is configured to emit or provide first writing beam 502. Light path 604 of first writing beam 502 may extend from light source 606 to recording medium 508.

First optical elements 602 include a spatial light modulator (SLM) 608, a mirror 610, a toric optical element 612, and a mirror 614, according to an embodiment. SLM 608 may be configured to tilt a wavefront of first writing beam 502 to subtract or modify linear phase of the wavefront, according to an embodiment. SLM 608 may be configured to modulate first writing beam 502 to provide writing signals that interfere with second writing beam 504 to record a hologram.

Mirror 610 may be positioned in light path 604 between SLM 608 and recording medium 508 to direct first writing beam 502 towards toric optical element 612. Mirror 610 may be constructed from any one of a number of reflective materials or surfaces to orient first writing beam 502 towards toric optical element 612. Mirror 610 may be oriented to tilt a wavefront of first writing beam 502 to subtract a linear phase of the wavefront.

Toric optical element 612 may be positioned in light path 604 between mirror 610 and recording medium 508. Toric optical element 612 may be configured to subtract, add, or otherwise modify quadratic phase of the wavefront of first writing beam 502, according to an embodiment. Toric optical element 612 may be implemented as a toric lens or as a diffractive optical element configured to operate on light similar to a toric lens. Toric optical element 612 may have a concave toric structure fabricated (e.g., etched) into a translucent body (e.g., glass, plastic). First writing beam 502 may exit toric optical element 612 toward mirror 614.

Mirror 614 may be positioned in light path 604 between toric optical element 612 and recording medium 508. Mirror 614 may be configured to tilt first writing beam 502 to subtract linear phase from the wavefront of first writing beam 502. Mirror 614 may be configured to receive first writing beam 502 and be configured to redirect first writing beam 502 towards recording medium 508 to support recording a hologram.

System 600 may include a fixture 616 that is configured to orient recording medium 508 to receive first writing beam 502 and second writing beam 504, according to an embodiment. Fixture 616 may have a translucent body that enables the writing beams to pass through while aligning recording medium 508 with a defined or predetermined recording medium sample plane 510, according to an embodiment.

System 600 includes a number of second optical elements 618 positioned in a light path 620 of second writing beam 504, to condition or prepare second writing beam 504 to support conically writing a spatially varying hologram, according to an embodiment. System 600 may include a light source 622 that is configured to emit or provide second writing beam 504. Light path 620 of second writing beam 504 may extend from light source 622 to recording medium 508.

Second optical elements 618 include an SLM 624, a mirror 626, a toric optical element 628, and a mirror 630, according to an embodiment. SLM 624 may be configured to tilt a wavefront of second writing beam 504 to subtract or modify linear phase of the wavefront, according to an embodiment. SLM 624 may be configured to modulate second writing beam 504 to provide writing signals that constructively and destructively interfere with first writing beam 502 to record a hologram.

Mirror 626 may be positioned in light path 620 between SLM 624 and recording medium 508. Mirror 626 may be configured to tilt second writing beam 504 to subtract linear phase from the wavefront of second writing beam 504. Mirror 626 may be configured to receive second writing beam 504 and be configured to redirect second writing beam 504 towards recording medium 508 to support recording a hologram.

Toric optical element 628 may be configured to subtract quadratic phase of the wavefront of second writing beam 504, according to an embodiment. Toric optical element 628 may be implemented as a toric lens or as a diffractive optical element configured to operate on light similar to a toric lens. Toric optical element 628 may be implemented as a plano-convex optical element fabricated from translucent material (e.g., glass, plastic). Second writing beam 504 may exit toric optical element 628 toward mirror 630.

Mirror 630 may be positioned in light path 620 between toric optical element 628 and recording medium 508. Mirror 630 may be configured to tilt second writing beam 504 to subtract linear phase from the wavefront of second writing beam 504. Mirror 630 may be configured to receive second writing beam 504 and be configured to redirect second writing beam 504 towards recording medium 508 to support recording a hologram.

FIGS. 7A-7E illustrate various vector operations for determining write vectors for writing beams (e.g., first and second writing beams 502 and 504) and for determining wavefronts for recording a spatially varying hologram in a recording medium, in accordance with aspects of the disclosure.

Figure 7A:
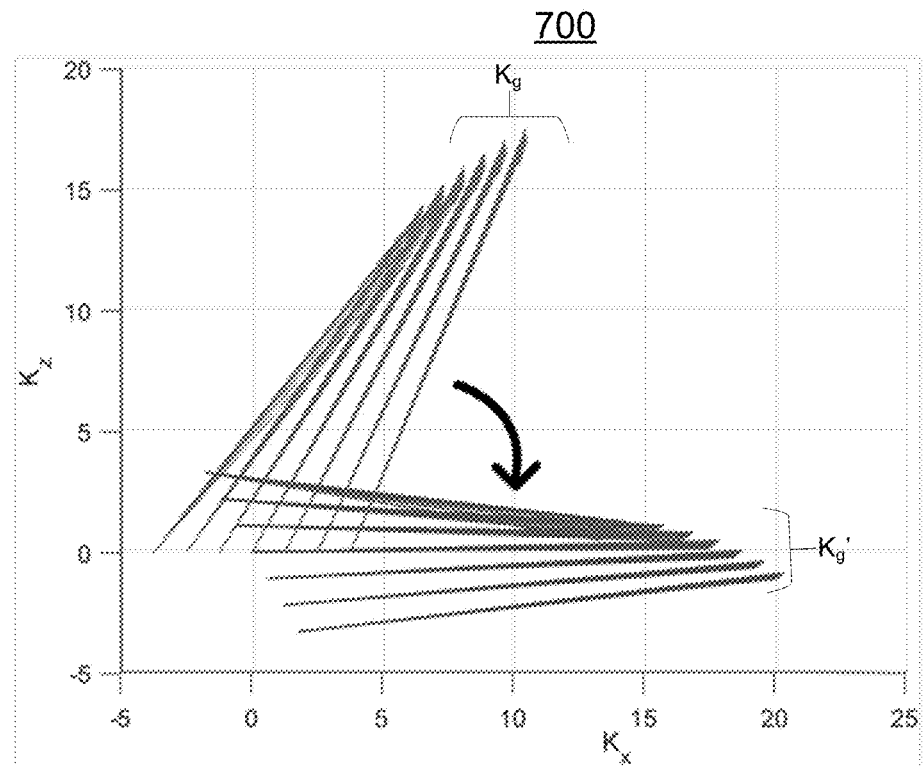
FIGS. 7A-7E illustrate various vector operations for determining write vectors for writing beams and for determining wavefronts for recording a spatially varying hologram in a recording medium, in accordance with aspects of the disclosure.

FIG. 7A illustrates graph 700 of an operation of rotating grating vectors $K_g$, in accordance with aspects of the disclosure. Grating vectors $K_g$ are rotated to become grating vectors $K_g'$. Grating vectors $K_g'$ are grating vectors $K_g$ that have been rotated until an average of the grating vectors is zero on one axis (e.g., on the $K_z$ axis).

Figure 7B:
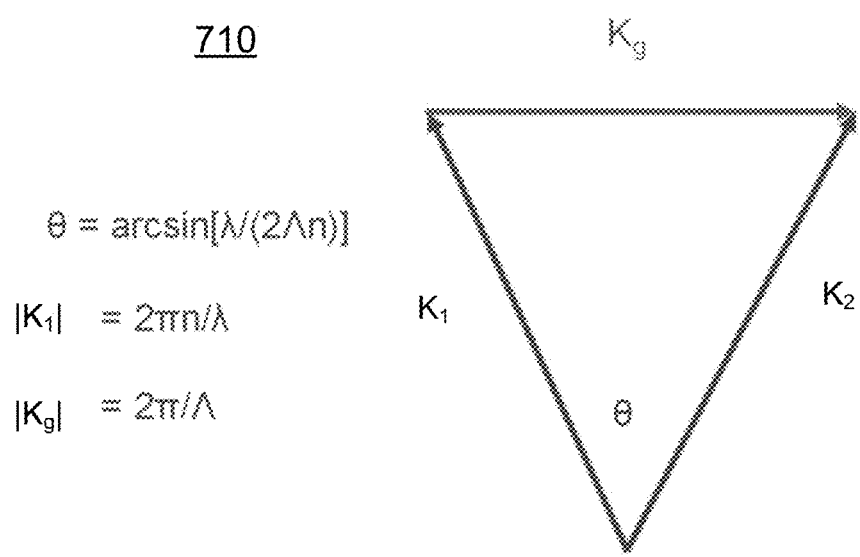

FIG. 7B illustrates an operation 710 of determining first writing vectors $K_1$ for a first writing beam, in accordance with aspects of the disclosure. Determining the first writing vectors $K_1$ includes choosing a writing wavelength and the exposure angles as though grating vectors $K_g'$ were in the table plane. In this context, the table plane refers to having first and second writing angles that are in the same plane (e.g., $K_x$, $K_z$) and not conical (e.g., angled along different/multiple planes).

$K_1$ and $K_g$ can be represented by Equation 1, Equation 2, and Equation 3, which are:

$$\theta = \arcsin[\lambda/(2\Lambda n)], \quad \text{Equation 1:}$$

$$|K_1| = 2\pi n/\lambda, \quad \text{Equation 2:}$$

$$|K_g| = 2\pi/\Lambda. \quad \text{Equation 3:}$$

Equation 1 defines an angle $\theta$ between first writing vectors $K_1$ and second writing vectors $K_2$, according to an embodiment. In Equation 1, a wavelength $\lambda$ represents the wavelength of the light used for the writing beams, according to an embodiment. A distance $\Lambda$ represents the spacing (or period) between gratings, according to an embodiment. A number of gratings n represents the number of gratings on, for example, a particular grating plane or other spatially varying hologram element, according to an embodiment. Equation 2 defines a magnitude $|K_1|$ of one or more of first writing vectors $K_1$, according to an embodiment. Equation 3 defines a magnitude $|K_g|$ of one or more of grating vectors $|K_g|$, according to an embodiment. Using Equations 1-3, characteristics of first writing vectors $K_1$ and grating vectors $K_g$ may be determined, in accordance with embodiments of the disclosure.

Figure 7C:
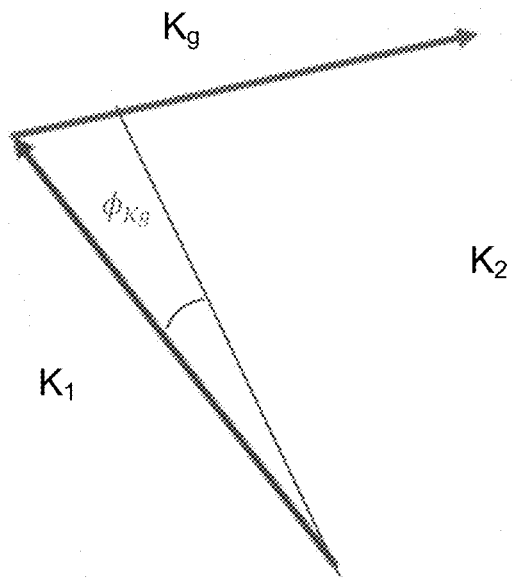

FIG. 7C illustrates an operation 720 of adjusting the writing angles of first writing vectors $K_1$ to generate grating vectors $K_g$, in accordance with embodiments of the disclosure. One or more of first writing vectors $K_1$ may be rotated along a first axis by a rotation angle $\phi_{Kg}$. Rotation angle $\phi_{Kg}$ represents the angle of one or more grating vectors $K_g$ in the xy plane (e.g., in the $K_x$, $K_y$ plane), according to an embodiment.

Figure 7D:
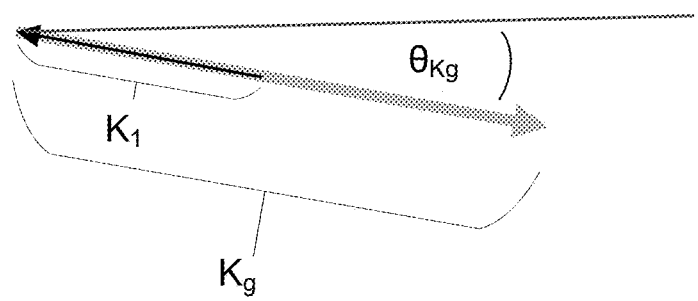

FIG. 7D illustrates an operation 730 of adjusting the writing angles of first writing vectors $K_1$ to generate grating vectors $K_g$, in accordance with embodiments of the disclosure. One or more of first writing vectors $K_1$ may be rotated along a second axis by a rotation angle $\theta_{Kg}$. Rotation angle $\theta_{Kg}$ represents the angle of one or more grating vectors $K_g$ in the xz plane (e.g., in the $K_x$, $K_z$ plane), according to an embodiment.

Figure 7E:
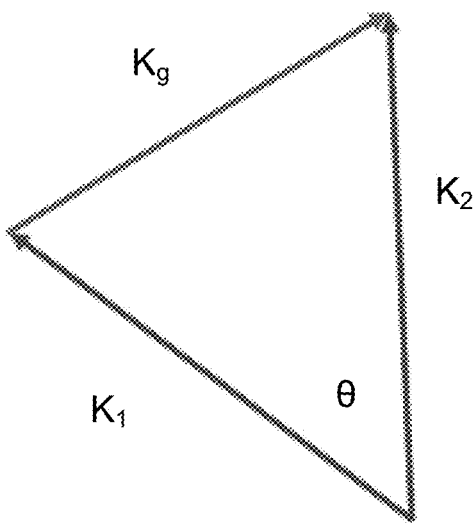

FIG. 7E illustrates an operation 740 of determining second writing vectors $K_2$ of a second writing beam, in accordance with embodiments of the disclosure. Second writing vectors $K_2$ may be defined as the sum of first writing vectors $K_1$ with gradient vectors $K_g$, according to an embodiment. More specifically, one of second writing vectors $K_2$ may be defined by the sum of one of first writing vectors $K_1$ with one of gradient vectors $K_g$ (e.g., $K_2 = K_1 + K_g$). The magnitude $|K_2|$ of each of second writing vectors $K_2$ may be confirmed by comparison with the magnitude $|K_1|$ of each of first writing vectors $K_1$. The magnitudes $|K_2|$ and $|K_1|$ are equal or are approximately equal, in an embodiment.

Figures 8A, 8B:
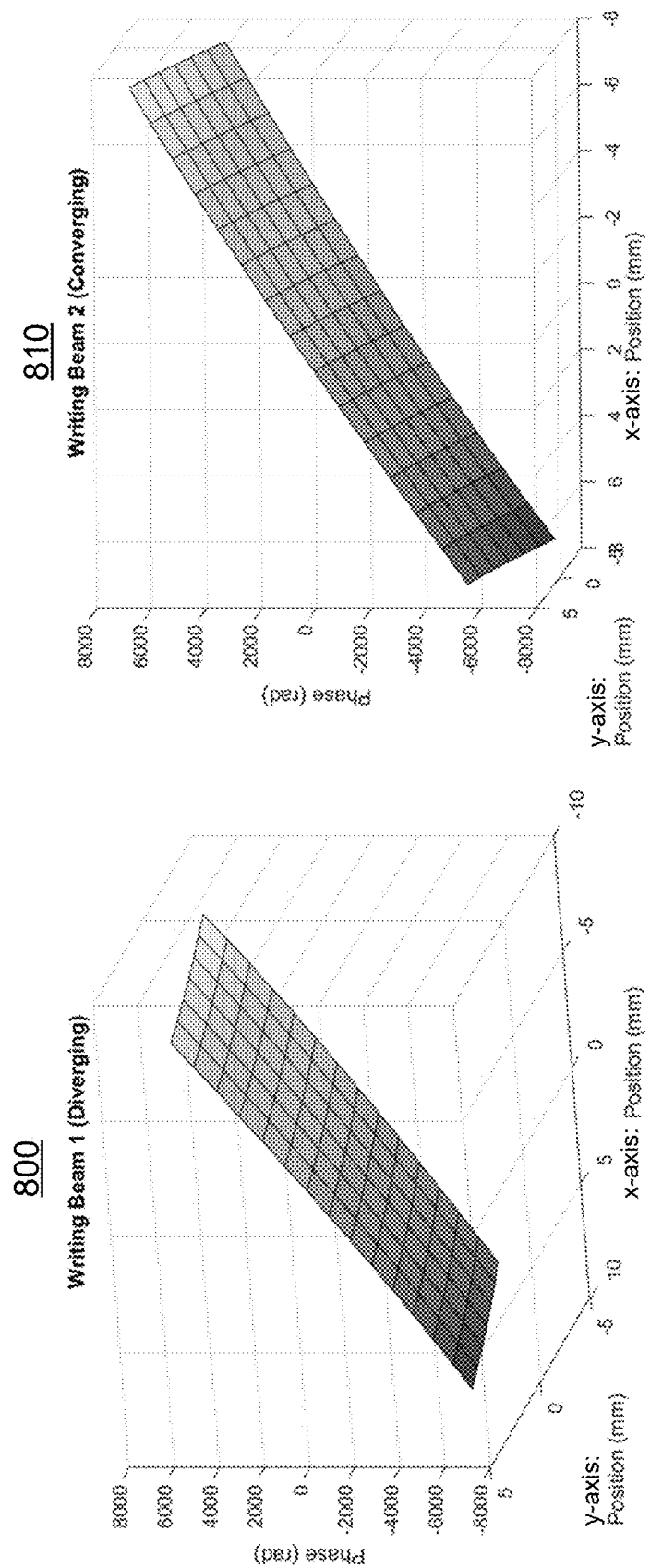
FIGS. 8A and 8B illustrate graphs of characteristics of first and second writing beams that can be used to conically record a hologram, in accordance with aspects of the disclosure.

FIGS. 8A and 8B illustrate graphs of characteristics of first and second writing beams that can be used to conically record a hologram, in accordance with embodiments of the disclosure.

FIG. 8A illustrates a graph 800 of characteristics of a first writing beam, in accordance with embodiments of the disclosure. Graph 800 illustrates the phase of the wavefront of the first writing beam diverging as position moves away from the center (0,0) of the first writing beam, according to an embodiment. This graph may be used to select a phase with which to illuminate a particular portion of the recording medium. For example, if a phase of approximately −6,000 radians were desired, a portion of the beam that is 5 mm in the y-axis direction and 5 mm in the x-axis direction may be directed at the portion of the recording medium that is being recorded upon.

FIG. 8B illustrates a graph 810 of characteristics of a second writing beam, in accordance with embodiments of the disclosure. Graph 810 illustrates the phase of the wavefront of the second writing beam converging as position moves away from the center (0,0) of the second writing beam, according to an embodiment. This graph may be used to select a phase with which to illuminate a particular portion of the recording medium.

Figure 9B:
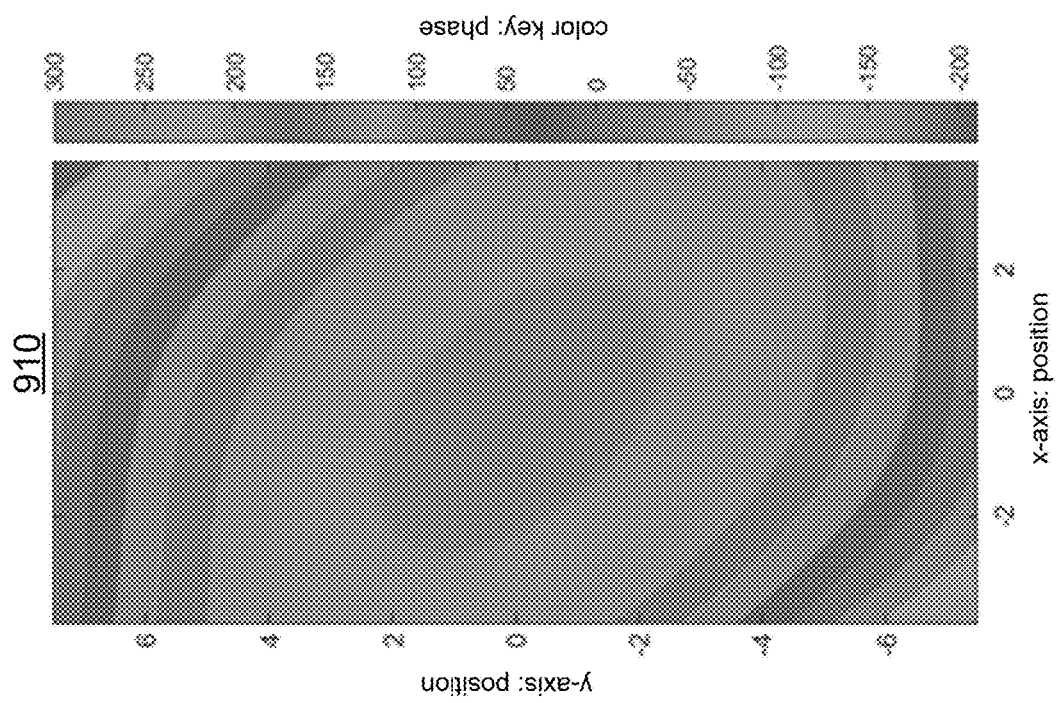
FIGS. 9A and 9B illustrate graphs of wavefront characteristics of first and second writing beams after subtracting linear phase, in accordance with aspects of the disclosure.
Figure 9A:
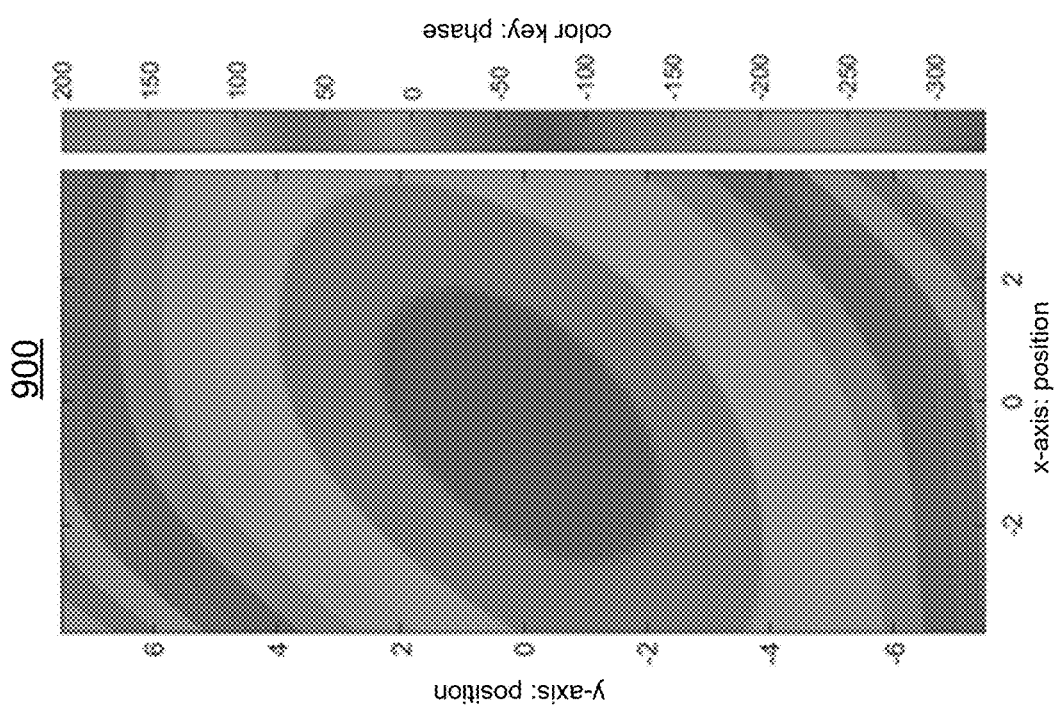

FIGS. 9A and 9B illustrate graphs of wavefront characteristics of first and second writing beams after subtracting linear phase, in accordance with embodiments of the disclosure.

FIG. 9A illustrates a graph 900 of wavefront characteristics of a first writing beam after subtracting linear phase, in accordance with embodiments of the disclosure. Linear phase may be generated or modified by the exposure angle of incidence of the wavefront, so linear phase may be subtracted by tilting the wavefront using one or more mirrors or SLMs positioned in the light path of the first writing beam, according to an embodiment. The x-axis and y-axis represent position in the wavefront of the first writing beam, and the color key represents phase of the wavefront.

FIG. 9B illustrates a graph 910 of wavefront characteristics of a second writing beam after subtracting linear phase, in accordance with embodiments of the disclosure. Linear phase may be generated or modified by the exposure angle of incidence of the wavefront, so linear phase may be subtracted by tilting the wavefront using one or more mirrors or SLMs positioned in the light path of the second writing beam, according to an embodiment.

Figure 10A:
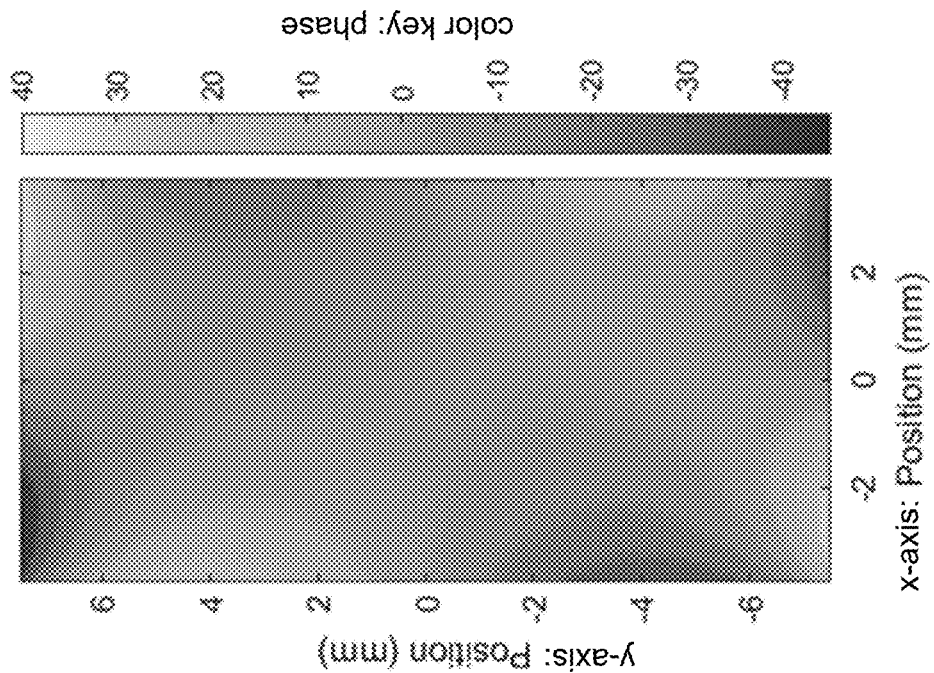
FIGS. 10A and 10B illustrate graphs of wavefront characteristics of first and second writing beams after subtracting quadratic phase, in accordance with aspects of the disclosure.
Figure 10B:
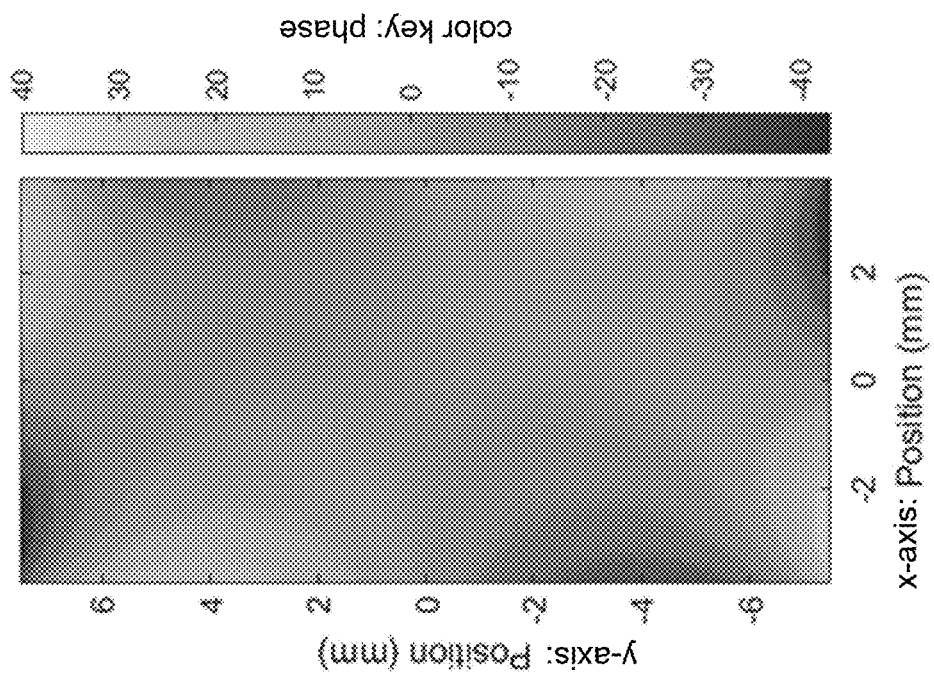

FIGS. 10A and 10B illustrate graphs of wavefront characteristics of the first and second writing beams after subtracting quadratic phase, in accordance with embodiments of the disclosure.

FIG. 10A illustrates a graph 1000 of wavefront characteristics of a first writing beam after subtracting quadratic phase, in accordance with embodiments of the disclosure. Quadratic phase may be generated by a toric lens or may be generated by a toric optical element that is configured to operate on light similar to a toric lens. Quadratic phase may be subtracted by passing first writing beam through a toric optical element configured to subtract quadratic phase from the wavefront of the first writing beam, according to an embodiment. Graph 1000 may have an x-axis, a y-axis, and a color key. The x-axis and y-axis represent position in the wavefront of the first writing beam, and the color key represents phase of the wavefront. As illustrated, graph 1000 shows that a relatively uniform phase across the wavefront may be achieved based on the subtraction of the linear and quadratic phases, according to an embodiment.

FIG. 10B illustrates a graph 1010 of wavefront characteristics of a second writing beam after subtracting quadratic phase, in accordance with embodiments of the disclosure. Quadratic phase may be subtracted by passing second writing beam through a toric optical element configured to subtract quadratic phase from the wavefront of the second writing beam, according to an embodiment. Graph 1010 may have an x-axis, a y-axis, and a color key. The x-axis and y-axis represent position in the wavefront of the second writing beam, and the color key represents phase of the wavefront of the second writing beam. As illustrated, graph 1010 shows that a relatively uniform phase across the wavefront may be achieved based on the subtraction of the linear and quadratic phases, according to an embodiment.

Figure 11A:
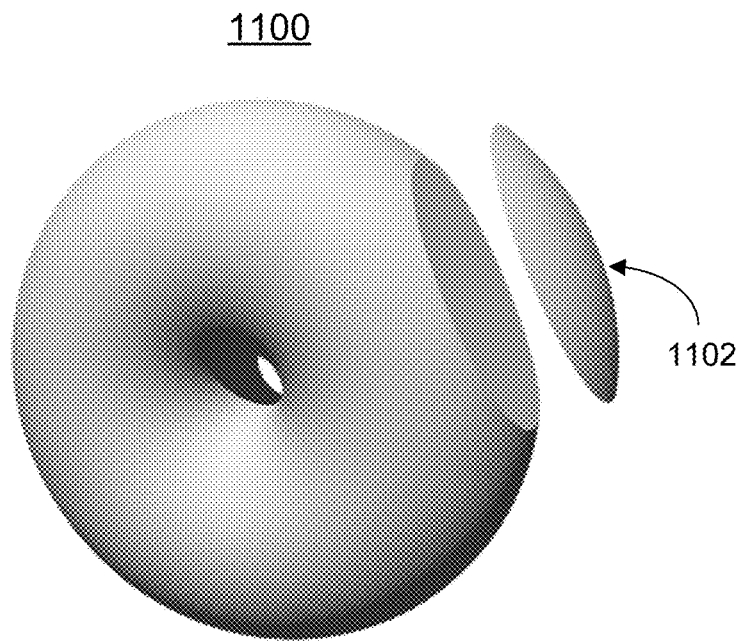
FIGS. 11A and 11B illustrate examples of characteristics of a toric optical element, in accordance with aspects of the disclosure.
Figure 11B:
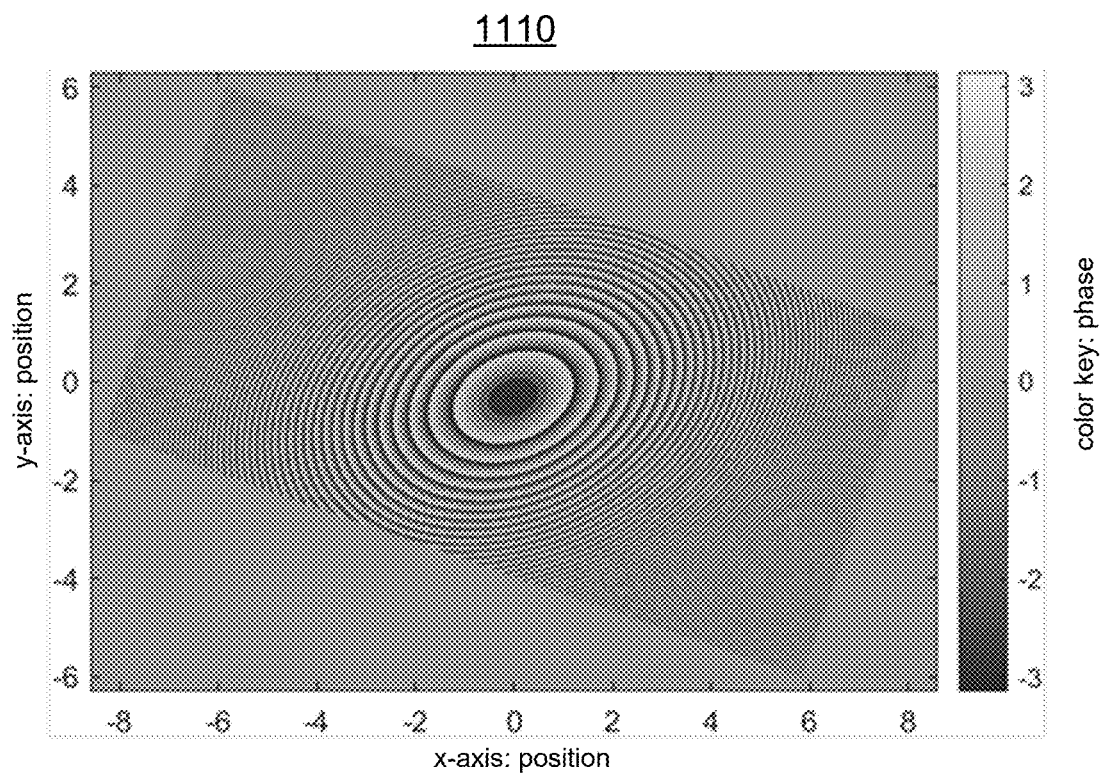

FIGS. 11A and 11B illustrate examples of characteristics of a toric optical element, in accordance with embodiments of the disclosure.

FIG. 11A illustrates a torus structure 1100 from which a toric lens 1102 may be fabricated. Toric lens 1102 is an example of a toric optical element that may be configured to subtract quadratic phase from a wavefront of a writing beam, in accordance with embodiments of the disclosure. Toric lens 1102 may be a plano-convex optical element.

FIG. 11B illustrates a graph 1110 of optical element characteristics of a toric optical element, in accordance with embodiments of the disclosure. Graph 1110 may have an x-axis, a y-axis, and a color key. The x-axis and y-axis represent position in the wavefront of an output of the toric optical element, in response to a writing beam or light source. The color key represents phase of the wavefront of the output of the toric optical element, according to an embodiment.

Figure 12:
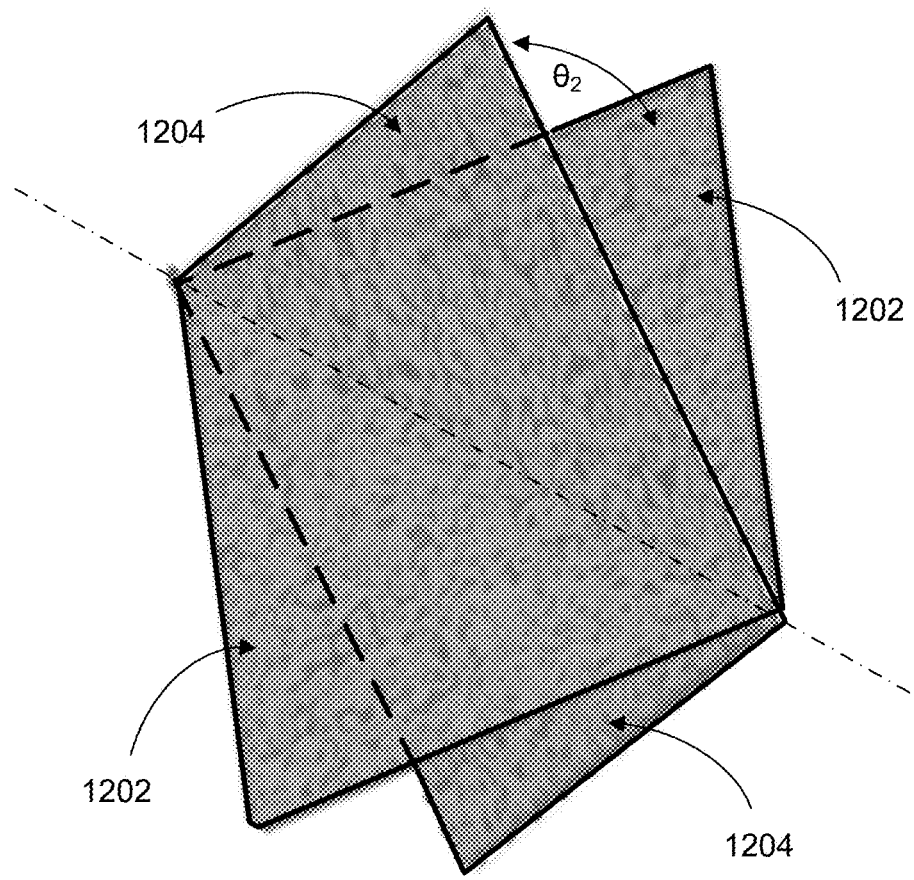
FIG. 12 illustrates a diagram of an intersection of wavefronts, in accordance with aspects of the disclosure.

FIG. 12 illustrates a diagram 1200 of an interaction of wavefronts, in accordance with embodiments of the disclosure. Diagram 1200 includes a wavefront 1202 and a wavefront 1204. Wavefront 1202 may represent a wavefront of a first writing beam, and wavefront 1204 may represent a wavefront of a second writing beam, according to an embodiment. Diagram 1200 may represent an intersection of wavefront 1202 and wavefront 1204 as they may interfere within a recording medium while recording a hologram, according to an embodiment. Wavefront 1202 and wavefront 1204 may intersect with an intersection angle $\theta_2$. Intersection angle $\theta_2$ may be based on a vector that is normal to the recording medium $n_{sample}$ and based on a vector of the first writing beam $k_{in}$, according to an embodiment. Intersection angle $\theta_2$ may be based on the inverse cosine of the dot product of the vector that is normal to the recording medium $n_{sample}$ and based on the vector of the first writing beam $k_{in}$, according to an embodiment. Intersection angle $\theta_2$ may be represented with Equation 4 as:

$$\theta_2 = \cos^{-1}(n_{sample} \cdot k_{in}). \quad \text{Equation 4:}$$

The phase of the wavefronts, which have had linear and quadratic phase subtracted, may be propagated to the equal index plane (shown in FIG. 6), which is the plane that is perpendicular to both the first and second wavefronts, according to an embodiment. The phase that is propagated to the equal index plan may then be backpropagated to the SLM (e.g., shown in FIG. 6) to define the phase of the wavefronts that the first and second writing beams should generate, according to an embodiment.

Figure 13:
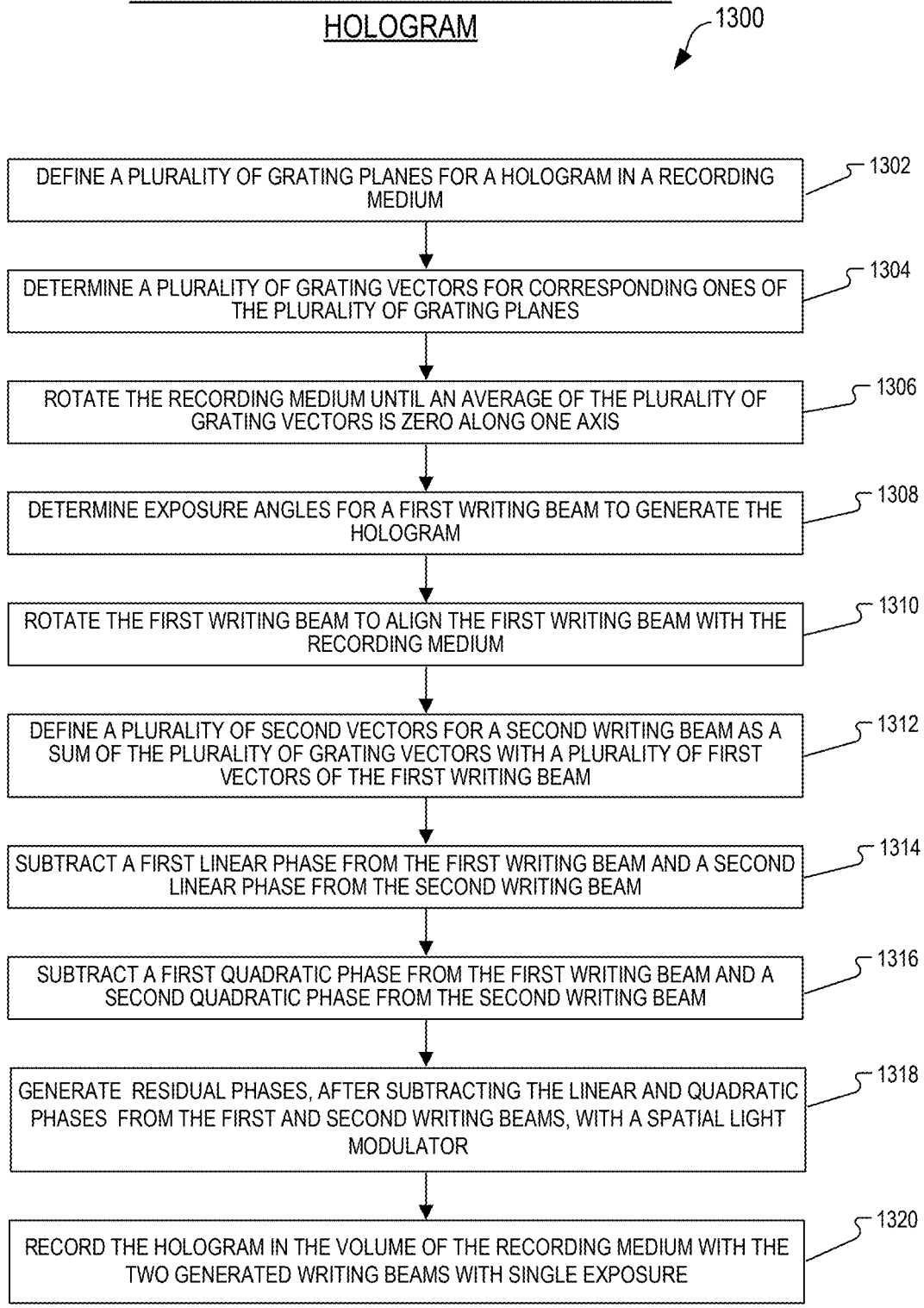
FIG. 13 illustrates a flow diagram of a process of conically recording a hologram, in accordance with aspects of the disclosure.

FIG. 13 illustrates a flow diagram 1300 of a process of conically recording a hologram, in accordance with embodiments of the disclosure. Process 1300 may be at least partially incorporated into one or more computing systems or non-transitory computer readable media to enable automated, manual, or automated and manual hologram recording, according to an embodiment. The order in which some or all of the process blocks appear in process 1300 should not be deemed limiting. Rather, one of ordinary skill in the art having the benefit of the present disclosure will understand that some of the process blocks may be executed in a variety of orders not illustrated, or even in parallel.

At process block 1302, process 1300 defines a plurality of grating planes for a hologram in a recording medium, according to an embodiment. The grating planes are examples of spatially varying holograms, but other types of holograms may be defined, in accordance with aspects of the disclosure. Process block 1302 proceeds to process block 1304, according to an embodiment.

At process block 1304, process 1300 determines a plurality of grating vectors for corresponding ones of the plurality of grating planes, according to an embodiment. The grating vectors are normal to the surfaces of corresponding ones of the grating vectors, according to an embodiment. Process block 1304 proceeds to process block 1306, according to an embodiment.

At process block 1306, process 1300 rotates the recording medium until an average of the plurality of grating vectors is zero along one axis, according to an embodiment. For example, the recording medium may be rotated along the y-axis or x-axis until an average of the grating vectors is zero along the z-axis. Process block 1306 proceeds to process block 1308, according to an embodiment.

At process block 1308, process 1300 determines exposure angles for a first writing beam to generate the hologram, according to an embodiment. Process block 1308 proceeds to process block 1310, according to an embodiment.

At process block 1310, process 1300 rotates the first writing beam to align the first writing beam with the recording medium, according to an embodiment. Process block 1310 proceeds to process block 1312, according to an embodiment.

At process block 1312, process 1300 defines a plurality of second vectors for a second writing beam as a sum of the plurality of grating vectors with a plurality of first vectors of the first writing beam, according to an embodiment. Process block 1312 proceeds to process block 1314, according to an embodiment.

At process block 1314, process 1300 subtracts a first linear phase from the first writing beam and a second linear phase from the second writing beam, according to an embodiment. Process block 1314 proceeds to process block 1316, according to an embodiment.

At process block 1316, process 1300 subtracts a first quadratic phase from the first writing beam and a second quadratic phase from the second writing beam, according to an embodiment. Process block 1314 proceeds to process block 1316, according to an embodiment.

At process block 1318, process 1300 generates residual phases, after subtracting the linear and quadratic phases from the first and second writing beams, with a spatial light modulator, according to an embodiment. Process block 1318 proceeds to process block 1320, according to an embodiment.

At process block 1320, process 1300 records the hologram in the volume of the recording medium with the two generated writing beams with a single exposure, according to an embodiment. Recording the hologram with a single exposure can be referred to as a single-shot recording, as opposed to a non-single shot recording.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., controller 118, processing logic 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memories 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A hologram recording system comprising:
a recording medium configured to record a hologram, wherein the recording medium includes a first surface, a second surface, and a volume between the first and second surfaces;
at least one light source configured to provide a writing beam; and
a plurality of optical elements positioned in a light path of the writing beam, wherein the plurality of optical elements are configured to condition the writing beam to record the hologram at least partially in the volume, wherein the plurality of optical elements include at least one toric optical element configured to subtract a quadratic phase from a wavefront of the writing beam, wherein the plurality of optical elements include a mirror configured to subtract a linear phase from the wavefront of the writing beam.

2. The hologram recording system of claim 1, wherein the writing beam is a first writing beam, wherein the at least one light source is configured to concurrently provide the first writing beam and a second writing beam, wherein the first writing beam and the second writing beam are configured to record the hologram with a single exposure.

3. The hologram recording system of claim 2, wherein the hologram includes a plurality of grating planes within the volume of the recording medium, wherein a plurality of grating vectors are normal to corresponding ones of the plurality of grating planes, wherein the first writing beam includes a plurality of first vectors, wherein the second writing beam includes a plurality of second vectors that are a sum of the plurality of grating vectors and the plurality of first vectors.

4. The hologram recording system of claim 2, wherein the wavefront is a first wavefront, wherein the at least one toric optical element is at least one first toric optical element, wherein the plurality of optical elements include at least one second toric optic element configured to subtract a quadratic phase from a second wavefront of the second writing beam, wherein the plurality of optical elements include one or more mirrors configured to tilt the second wavefront of the second writing beam to subtract a linear phase from the second wavefront of the second writing beam.

5. The hologram recording system of claim 2 further comprising:
a fixture configured to carry and orient the recording medium, wherein the fixture is configured to orient the recording at a non-zero angle with reference to an equal index plane of the first writing beam and the second writing beam.

6. The hologram recording system of claim 1, wherein the at least one toric optical element includes a refractive toric lens or a diffractive optical element configured to provide toric lens functionality.

7. The hologram recording system of claim 1, wherein the at least one toric optical element includes a convex toric optical element or a concave toric optical element.

8. The hologram recording system of claim 1, wherein the mirror is configured to tilt the wavefront of the writing beam to subtract the linear phase from the wavefront of the writing beam.

9. The hologram recording system of claim 1 further comprising:
a spatial light modulator positioned in the light path and configured to modulate the writing beam.

10. A method of conically recording a hologram comprising:
defining a plurality of grating planes for a hologram in a recording medium;
determining a plurality of grating vectors for corresponding ones of the plurality of grating planes;
rotating the recording medium until an average of the plurality of grating vectors is zero along one axis;
determining exposure angles for a first writing beam to generate the hologram;
rotating the first writing beam to align the first writing beam with the recording medium;
defining a plurality of second vectors for a second writing beam as a sum of the plurality of grating vectors with a plurality of first vectors of the first writing beam;
subtracting a first linear phase from the first writing beam and a second linear phase from the second writing beam; and
subtracting a first quadratic phase from the first writing beam and a second quadratic phase from the second writing beam.

11. The method of claim 10 further comprising:
backpropagating a first remaining phase of the first writing beam to a plane that is perpendicular to an average of the plurality of first vectors; and
backpropagating a second remaining phase of the second writing beam to a plane that is perpendicular to an average of the plurality of second vectors.

12. The method of claim 11 further comprising:
backpropagating the first remaining phase of the first writing beam to a first spatial light modulator (SLM); and
backpropagating the second remaining phase of the second writing beam to a second spatial light modulator (SLM).

13. The method of claim 10 further comprising:
generating a first wavefront corresponding to the first writing beam; and
generating a second wavefront corresponding to the second writing beam.

14. The method of claim 10, wherein rotating the first writing beam includes rotating the first writing beam by an angle in an xy plane of the average of the plurality of grating vectors.

15. The method of claim 14, wherein rotating the first writing beam includes rotating the first writing beam by an angle in an xz plane of the average of the plurality of grating vectors.

16. The method of claim 10, wherein subtracting the first linear phase from the first writing beam includes tilting the first writing beam with a first mirror, wherein subtracting the second linear phase from the second writing beam includes tilting the second writing beam with a second mirror.

17. The method of claim 10, subtracting the first quadratic phase from the first writing beam includes propagating the first writing beam through a first toric optical element, wherein subtracting the second quadratic phase from the second writing beam includes propagating the second writing beam through a second toric optical element.

18. The method of claim 10 further comprising:
verifying that an absolute value of an average of the plurality of first vectors is approximately equal to an average of the plurality of second vectors to confirm the defining of the second writing beam.

19. A method of conically recording a hologram comprising:
defining a plurality of gratings for a hologram recorded in a volume of a recording medium;
determining a plurality of grating vectors for corresponding ones of the plurality of gratings;
rotating the recording medium until an average of the plurality of grating vectors is zero along one axis;
determining exposure angles for a writing beam based on the recording medium not being rotated;
subtracting a linear phase from the writing beam by reflecting the writing beam from a mirror that is tilted to compensate for the linear phase; and
subtracting a quadratic phase from the writing beam by passing the writing beam through a toric lens.

20. The method of claim 19, wherein the writing beam is a first writing beam, wherein the method further comprises:
defining a second writing beam as a sum of the plurality of grating vectors with a plurality of vectors of the first writing beam; and
concurrently illuminating the recording medium with the first writing beam and the second writing beam while the recording medium is positioned in a recording plane that is off-angle to an equal index plane of the first and second writing beams.

* * * * *